(12) United States Patent
Hasebe

(10) Patent No.: US 7,073,818 B2
(45) Date of Patent: Jul. 11, 2006

(54) AIR BAG

(75) Inventor: Masahiro Hasebe, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/064,707

(22) Filed: Aug. 8, 2002

(65) Prior Publication Data

US 2003/0030254 A1    Feb. 13, 2003

(30) Foreign Application Priority Data

Aug. 10, 2001    (JP)    ............... 2001-244019

(51) Int. Cl.
  *B60R 21/231*    (2006.01)
  *B60R 21/233*    (2006.01)
(52) U.S. Cl. .................... 280/729; 280/743.1
(58) Field of Classification Search ........... 280/729, 280/731, 732, 743.1, 743.2
  See application file for complete search history.

(56) References Cited

U.S. PATENT DOCUMENTS

| | | | | |
|---|---|---|---|---|
| 5,129,675 | A | * | 7/1992 | Wang ...................... 280/743.1 |
| 5,358,273 | A | * | 10/1994 | Onishi et al. ............. 280/743.1 |
| 5,380,038 | A | * | 1/1995 | Hawthorn et al. ........ 280/730.1 |
| 5,577,765 | A | * | 11/1996 | Takeda et al. .............. 280/729 |
| 5,683,109 | A | * | 11/1997 | Birman ..................... 280/743.2 |
| 5,791,685 | A | * | 8/1998 | Lachat et al. ............. 280/743.1 |
| 5,906,391 | A | * | 5/1999 | Weir et al. .................. 280/729 |
| 6,168,203 | B1 | | 1/2001 | Amamori |
| 6,308,983 | B1 | * | 10/2001 | Sinnhuber ................... 280/735 |
| 6,390,501 | B1 | * | 5/2002 | Greib et al. ............. 280/743.2 |
| 6,439,606 | B1 | * | 8/2002 | Okada et al. ............ 280/743.1 |
| 6,517,109 | B1 | * | 2/2003 | Van Poppel ............. 280/743.1 |
| 6,523,855 | B1 | * | 2/2003 | Musiol et al. .............. 280/729 |
| 6,832,780 | B1 | * | 12/2004 | Amamori ................ 280/743.2 |
| 2001/0033072 | A1 | * | 10/2001 | Kumagai et al. ........ 280/730.1 |
| 2002/0175511 | A1 | * | 11/2002 | Dunkle et al. ........... 280/743.2 |
| 2003/0034637 | A1 | * | 2/2003 | Wang et al. ................ 280/729 |

FOREIGN PATENT DOCUMENTS

| | | |
|---|---|---|
| JP | 9-30352 | 2/1997 |
| JP | 10-315892 | 12/1998 |
| JP | 11-5505 | 1/1999 |
| JP | 2000-25544 | 1/2000 |

* cited by examiner

*Primary Examiner*—Paul N. Dickson
*Assistant Examiner*—Laura B. Rosenberg
(74) *Attorney, Agent, or Firm*—Foley & Lardner LLP

(57) ABSTRACT

An air bag having a connecting piece that connects a rear section and a front section, in which the outer surface of the front section is smooth, and connection of the panels by sewing is facilitated. The air bag includes a front upper panel, a front lower panel, and a rear panel that constitute an outer shell, and a mid panel is placed therein. The front upper panel includes a body portion, and an extending piece extending from one edge of the body portion. A lower edge of the mid panel and a lower edge of the extending piece are sewn together at seams inside the air bag. Seams to and to formed by sewing the edges are placed inside the air bag. As a result, seams are not exposed on the front face and side faces of the air bag, and the faces are smooth.

13 Claims, 19 Drawing Sheets

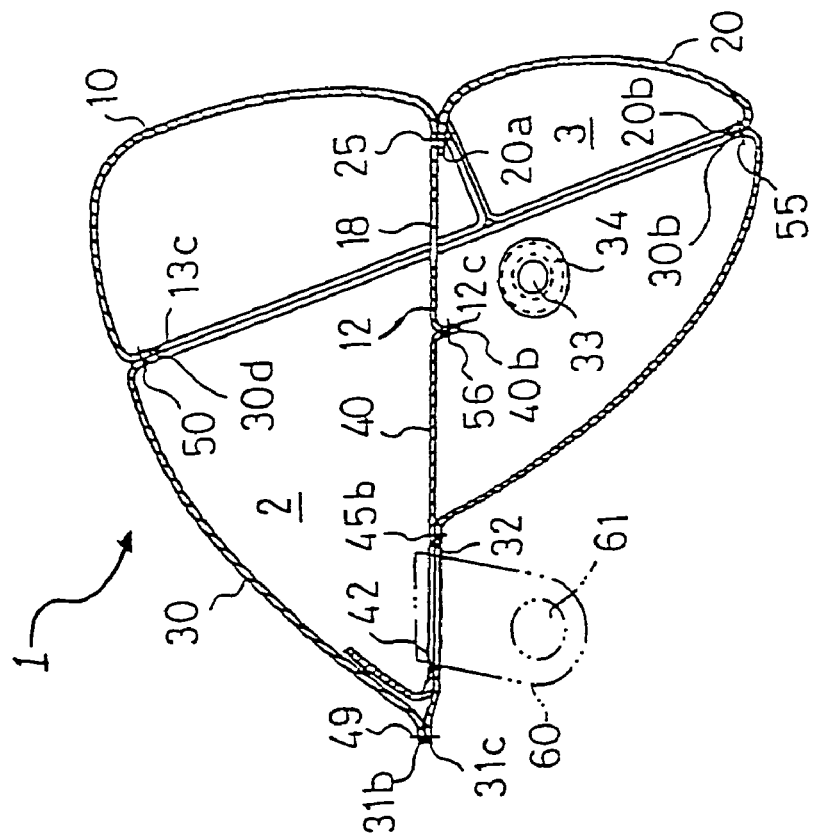
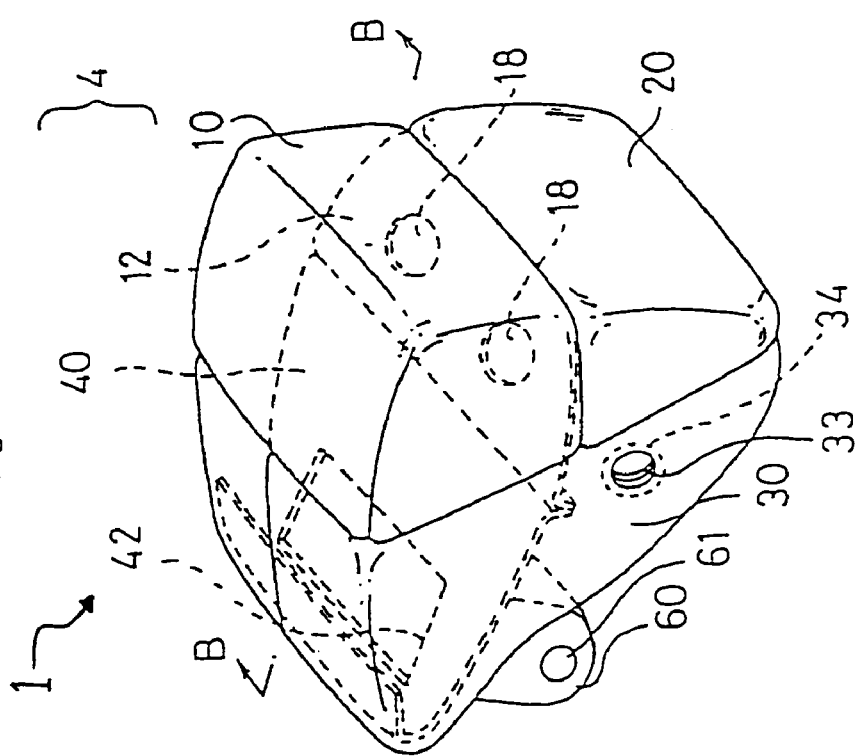

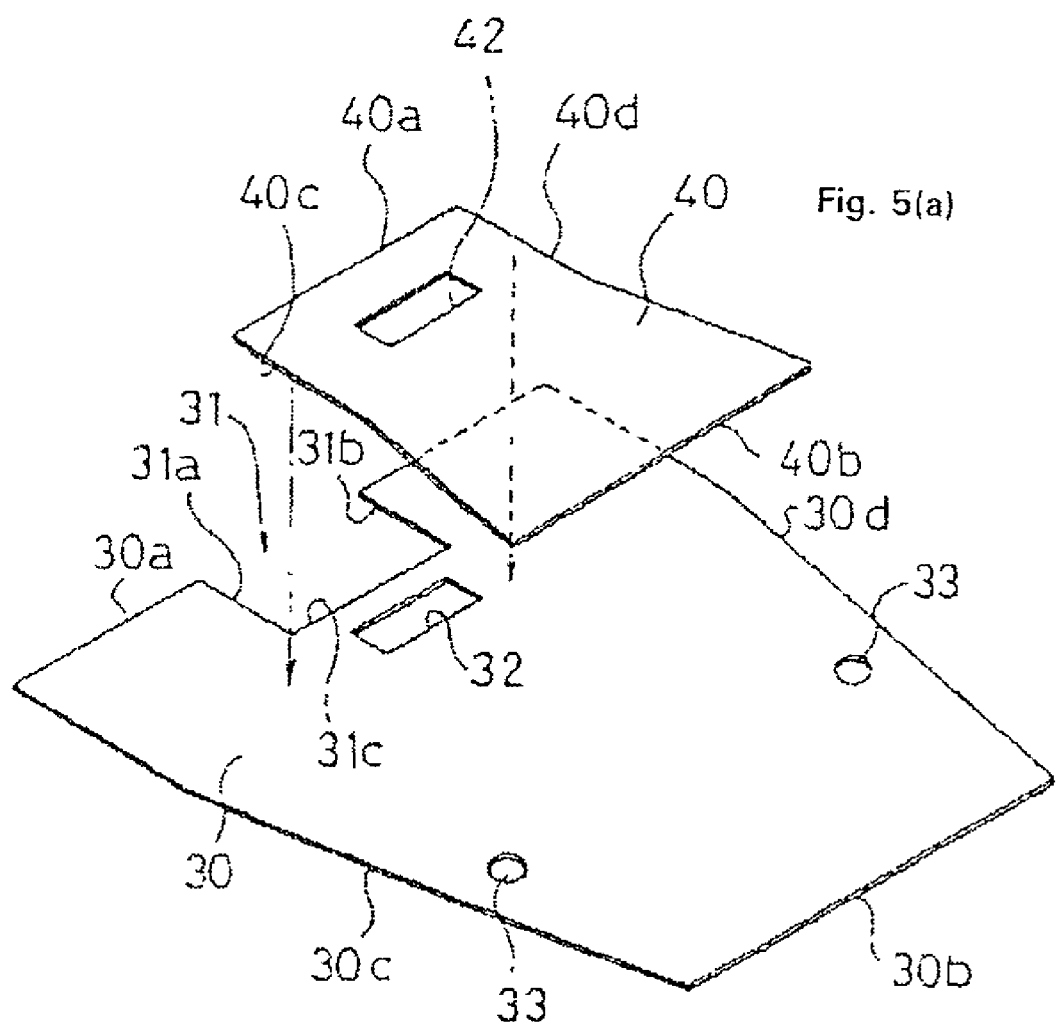

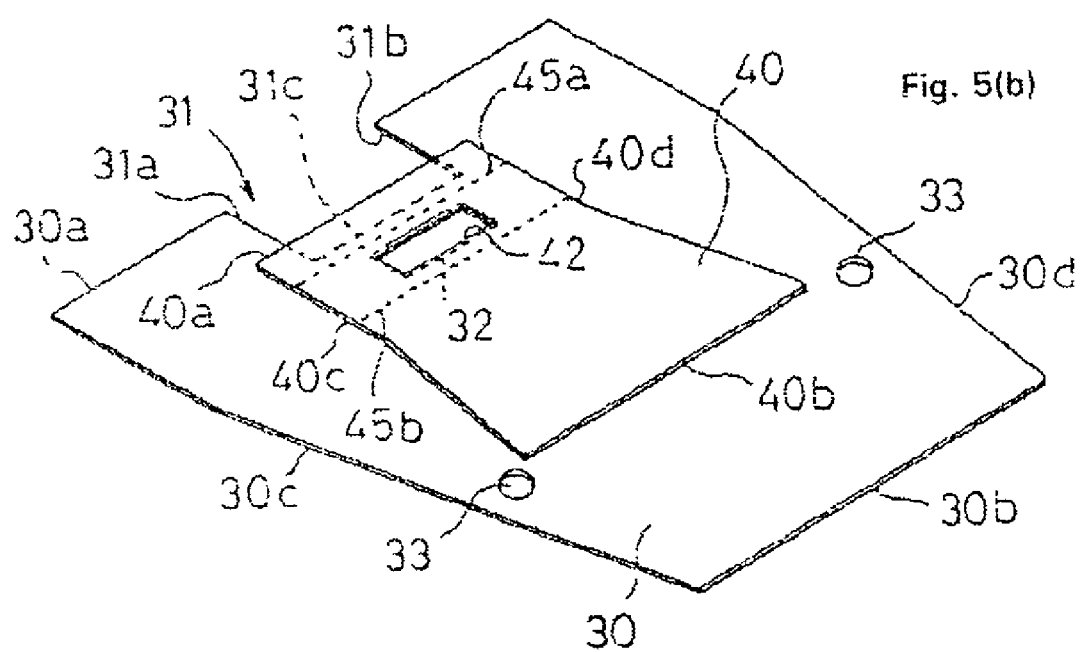

AIR BAG

BACKGROUND

The present invention relates to an air bag for protecting the passenger in a car or the like. An example of such an air bag is an air bag that is suitably used as a passenger-side air bag. More particularly, the present invention relates to an air bag in which the front and rear of the interior of the air bag are connected by a connecting piece.

A connecting piece for connecting the front and rear of a passenger-side air bag is sometimes placed inside the air bag (see, for example, Japanese Unexamined Patent Application Publication No. H10-315892, incorporated by reference herein in its entirety). In the air bag in this publication, the rear end of a connecting piece (referred to as a "tether" in this publication) is sewn on the periphery of a gas inlet of the air bag, and the front end thereof is sewn on the front of the air bag.

When the front end of the connecting piece (tether) is sewn on the front of the air bag, as in the above related art, sewn seams are exposed at the front of the air bag, and the smoothness of the front of the air bag is decreased.

SUMMARY OF THE INVENTION

An object of the present invention is to smoothen an outer front surface of an air bag that has a connecting piece for connecting the front and rear of the air bag. Another object of the present invention is to provide an air bag that makes connection, such as sewing, easy to accomplish.

According to an embodiment of the present invention, an air bag of the present invention includes a gas inlet disposed in a rear section, and a connecting piece placed inside the air bag so as to connect a front section and the rear section. The outer shell of the air bag includes a rear panel having the gas inlet, and a plurality of front panels connected so as to form the front section, and an extending piece extends from a part of the front panels into the air bag. The extending piece and the rear section of the air bag are connected by a mid panel. The connecting piece is formed by the extending piece and the mid panel.

According to an embodiment of the present invention, the connecting piece is constituted by the mid panel and the extending piece, and the extending piece extends from the front panel. Therefore, a connecting portion between the mid panel and the extending piece is separate from the air-bag front section, and is not exposed in the air-bag front section. As a result, the air-bag front section (outer surface) is smooth. A connecting portion between the front panels is preferably placed inside the air bag at least in the air-bag front section.

According to another exemplary embodiment of the present invention, the front panel may include a front upper panel and a front lower panel, that one of the front upper panel and the front lower panel include a body portion and the extending piece formed integrally with the body portion, and that an edge of the other of the front upper panel and the front lower panel be connected to a boundary portion between the body portion and the extending piece. According to this embodiment, when two front panels are employed in this manner, the number of the panels can be minimized, and sewing cost is reduced.

According to an embodiment of the present invention, an opening is formed in the extending piece thereby allowing chambers on both sides of the extending piece inside the air bag to be interconnected.

An embodiment of the present invention provides for connecting the other of the front upper panel and the front lower panel to the boundary portion, the extending piece extends into the air bag. When the connecting portion is placed inside the air bag, it is not exposed from the outer surface of the front section of the air bag.

According to this embodiment of the present invention, a top portion on the upper side of the front upper panel, side portions on both sides thereof, and side portions on both sides of the front lower panel are positioned on the sides of the air bag, the top portion of the front upper panel is connected to the rear panel on the upper surface of the air bag, the side portions of the front upper panel and the side portions of the front lower panel are connected to the rear panel on the sides of the air bag, a lower edge of the front lower panel is connected to the rear panel at the bottom of the air bag, and the connecting portions among the rear panel and the front upper and lower panels are placed in the front section of the air bag.

According to one embodiment of the present invention, it is preferable that the connection be done by sewing, and that a sewn portion be placed inside the air bag by reversing the air bag through an unsewn portion of the rear panel so as to make the outer surface of the air bag smooth.

It is to be understood that both the foregoing general description and the following detailed description are exemplary and explanatory only and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 1(a) is a perspective view showing an expanded state of a passenger-side air bag of a car according to an embodiment of the present invention.

FIG. 1(b) is a sectional view, taken along line B—B in FIG. 1(a).

FIGS. 5(a) and 5(b) are perspective views showing a process for producing the air bag shown in FIG. 1(a).

DETAILED DESCRIPTION

Figure 2:
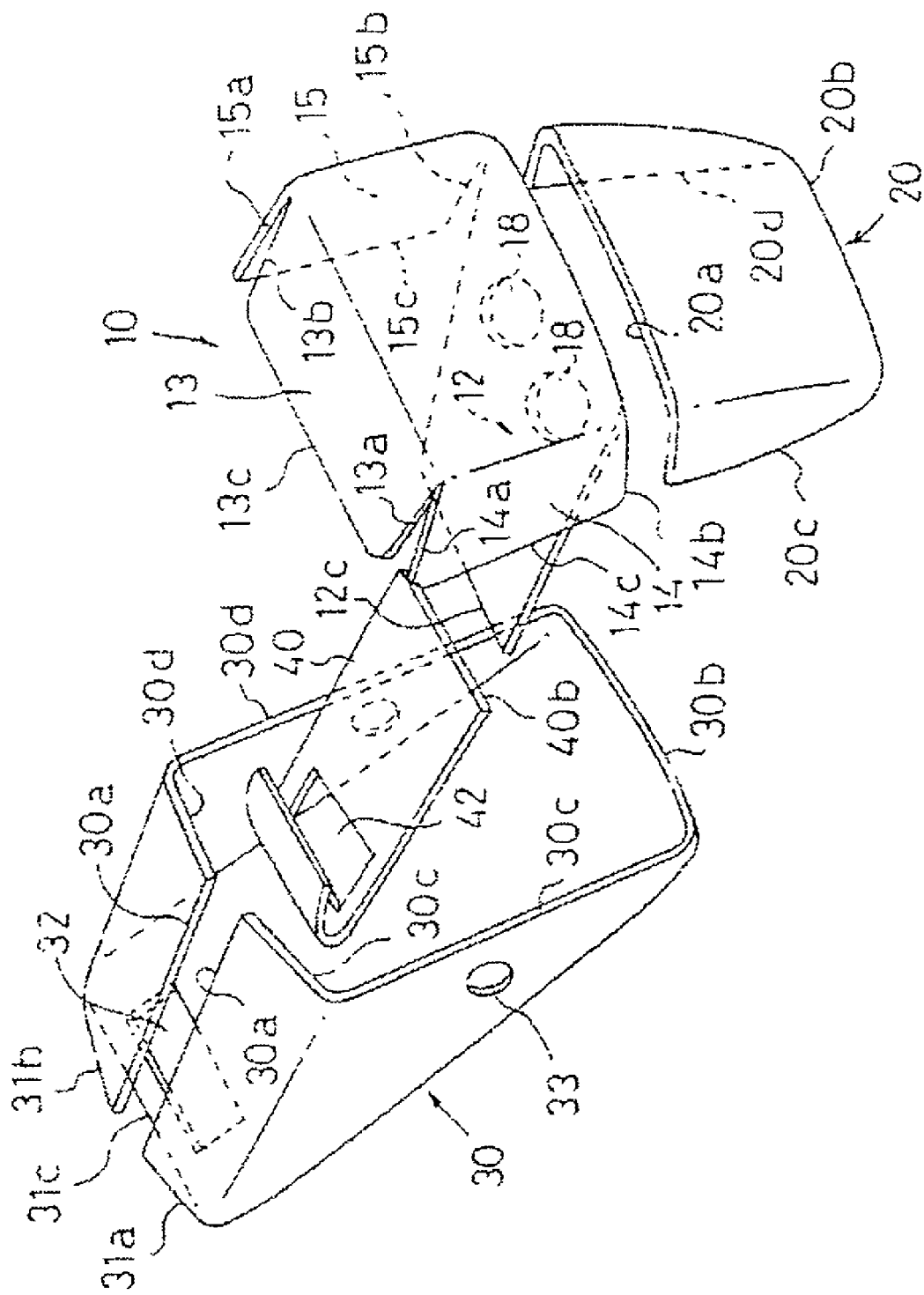
FIG. 2 is an exploded perspective view of the air bag shown in FIG. 1(a).

Embodiments of the present invention will be described in detail below with reference to the drawings.

As shown in FIG. 1, according to an embodiment of the present invention, a passenger-side air bag 1 includes a front upper panel 10, a front lower panel 20, and a rear panel 30 that constitute an outer shell thereof, and a mid panel 40 is placed therein.

Figure 3:
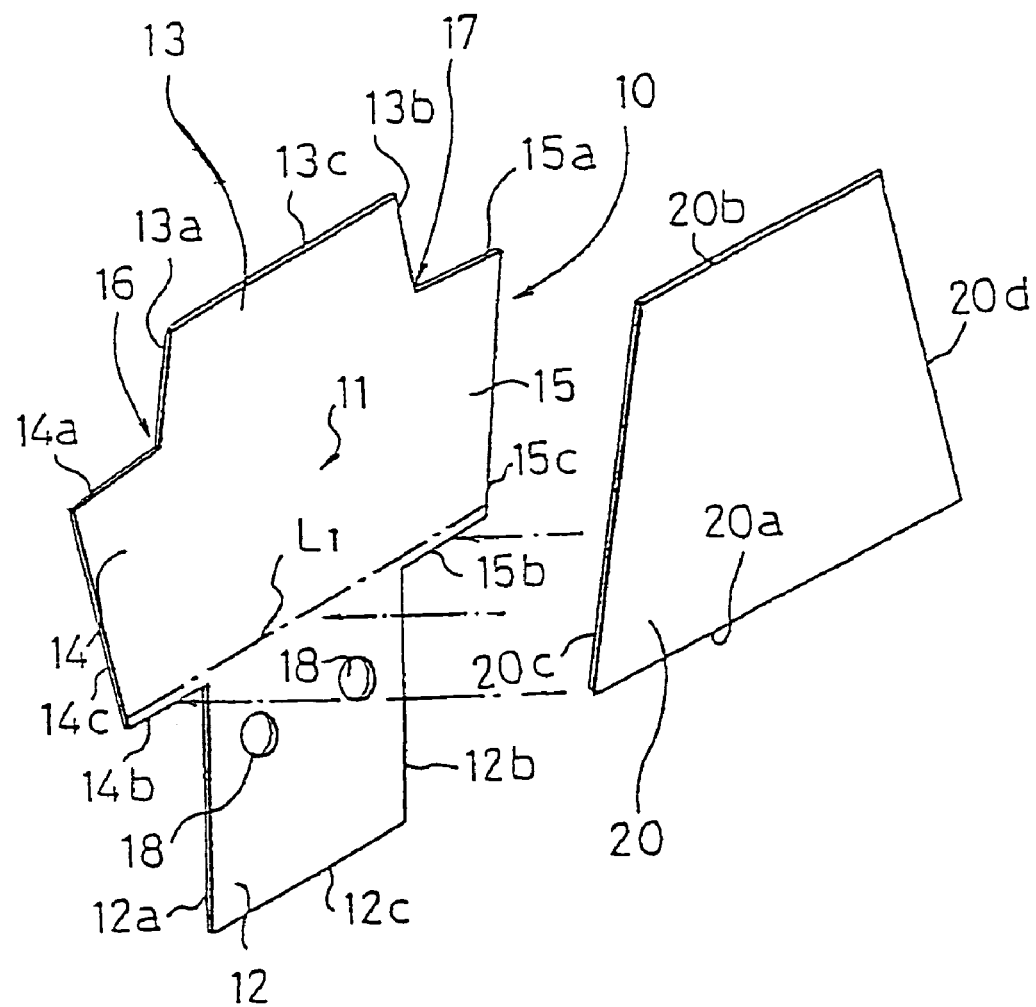
FIG. 3 is a perspective view showing a process for producing the air bag shown in FIG. 1(a).
Figure 4:
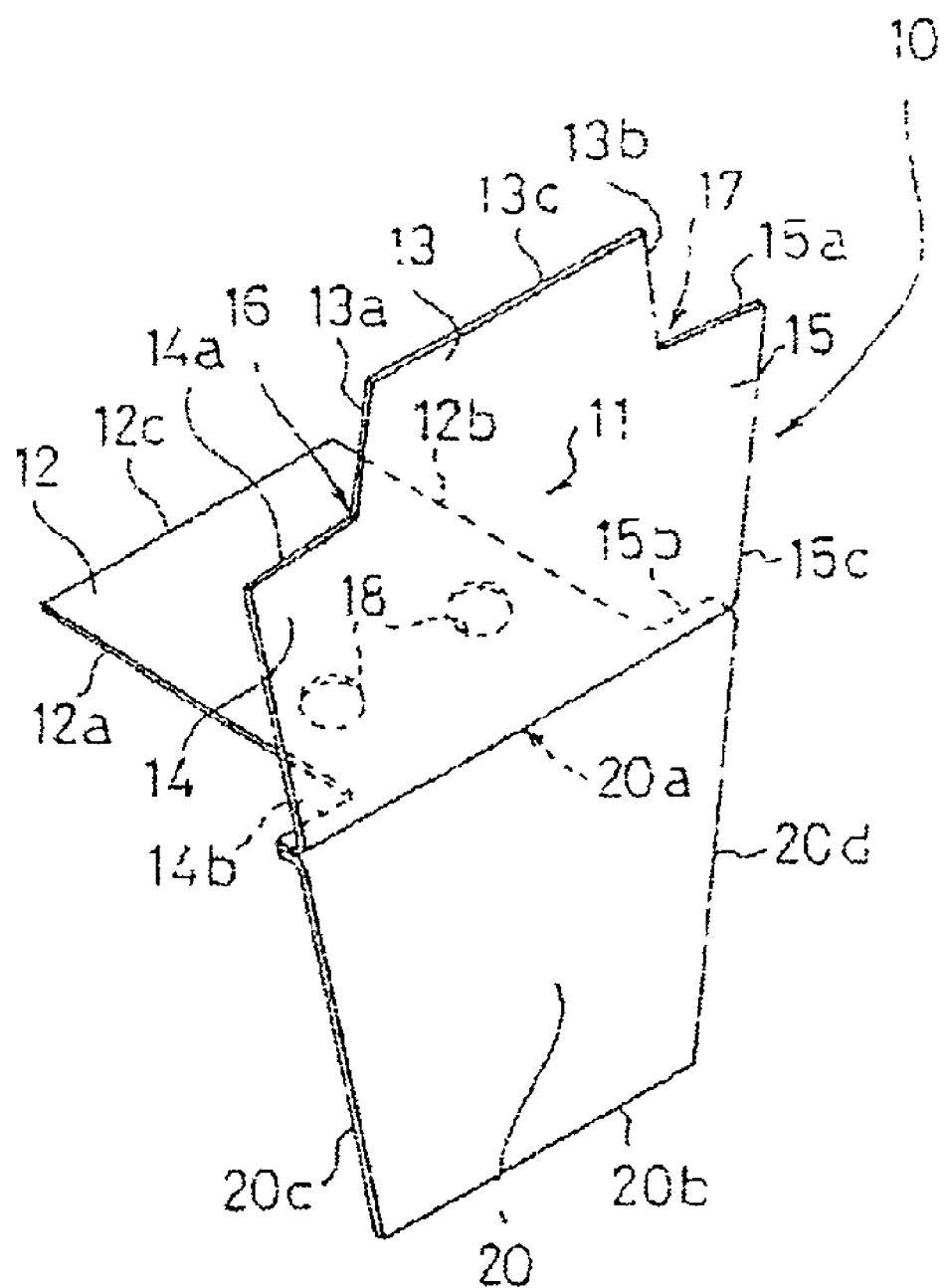
FIG. 4 is a perspective view showing a process for producing the air bag shown in FIG. 1(a).

As shown in FIGS. 3 and 4, the front upper panel 10 includes a body portion 11, and an extending piece 12 extending from one edge of the body portion 11. A top portion 13 projects from a side opposite from the above side of the body portion 11, and side portions 14 and 15 project from both edges connected to the above side. Substantially L-shaped cutouts 16 and 17 are formed between the side portions 14 and 15 and the top portion 13. Edges of the cutouts 16 and 17 are formed of side edges 13a and 13b of the top portion 13 and side edges 14a and 15a of the side portions 14 and 15. The top portion 13 includes a leading edge 13c.

The width of the body portion 11 is larger than that of the extending piece 12, and the side portions 14 and 15 project sideward from the extending piece 12. The side portions 14, 15 include lower edges 14b, 15b and leading edges 14c, 15c. The lower edges are linked across the top portion by a segment L1.

The extending piece 12 includes side edges 12a, 12b and a lower edge 12c. The extending piece 12 includes openings 18.

The front lower panel 20 is shaped like a trapezoid including an upper edge 20a, a lower edge 20b, and a pair of side edges 20c and 20d. The length of the upper edge 20a is equal to the width of the lower end of the body portion 11.

As shown in FIG. 3, the fabrication of the air bag, the upper edge 20a of the front lower panel 20 is placed on the segment Li and the side-portion lower edges 14b and 15b of the front upper panel 10. The front panels are sewn together along a seam 25, as shown in FIG. 1(b).

As shown in FIGS. 5(a) and 5(b), the rear panel 30 is shaped nearly like a trapezoid including an upper edge 30a, a lower edge 30b, and a pair of side edges 30c and 30d. A rectangular cutout 31 is formed at the center of the upper edge 30a. The side edges 31a, 31b of the cutout intersect the upper edge 30a at substantially right angles. The cutout also includes a bottom edge 31c denotes a cutout bottom edge that links the cutout side edges 31a and 31b. The rear panel 30 has a gas inlet 32 adjacent to the cutout 31. The rear panel 30 also has vent holes 33 adjacent to the side edges 30c and 30d. An annular reinforcing cloth 34 is seamed around each vent hole 33. as shown in FIGS. 1(a) and 1(b).

The mid panel 40 is shaped nearly like a rectangle including an upper edge 40a, a lower edge 40b, and a pair of side edges 40c and 40d, and having a gas inlet 42 having the same size as that of the gas inlet 32. It is preferable that the mid panel be made of a flame-resistant cloth.

The rear panel 30 and the mid panel 40 are placed one on the other so that the upper edges 30a and 40a are parallel to each other, the gas inlets 32 and 42 are aligned, and the lower edge 40b of the mid panel 40 is oriented toward the lower edge 30b of the rear panel 30, and are sewn together at seams 45a or 45b parallel to the upper edge 40a of the mid panel 40. The seams 45a and 45b extend in parallel with the upper edges 30a and 40a. The seam 45a is between the gas inlet 32 and the cutout bottom edge 31c and the other seam 45b is on the other side of the gas inlet 32.

Figure 7A:
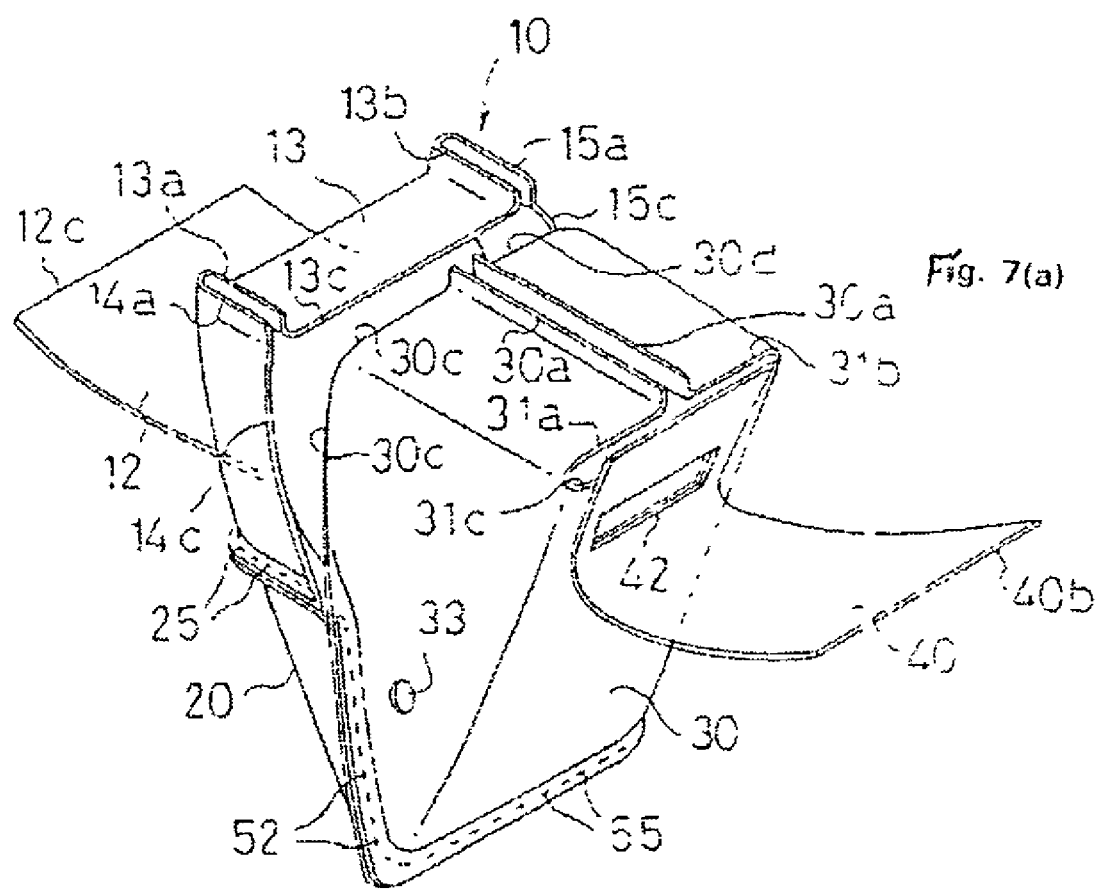
FIGS. 7(a) and 7(b) are perspective views showing a process for producing the air bag shown in FIG. 1(a).
Figure 7B:
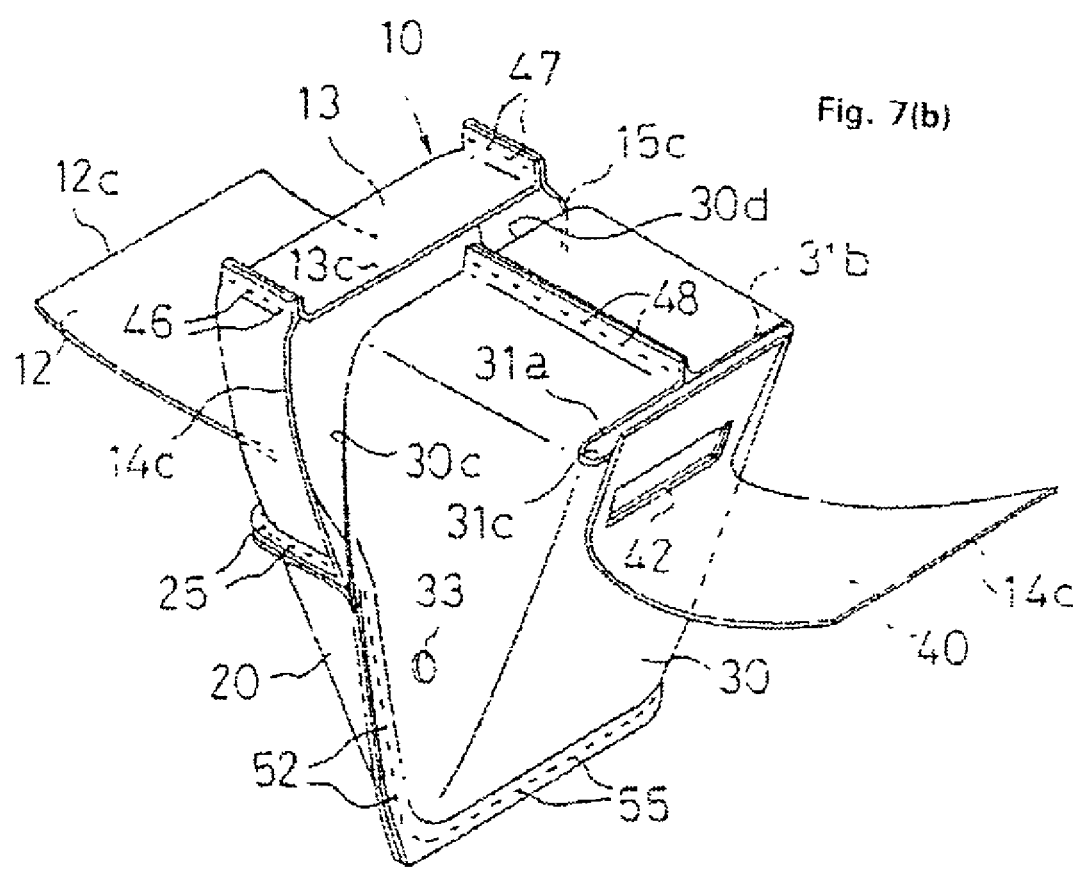
Figure 8:
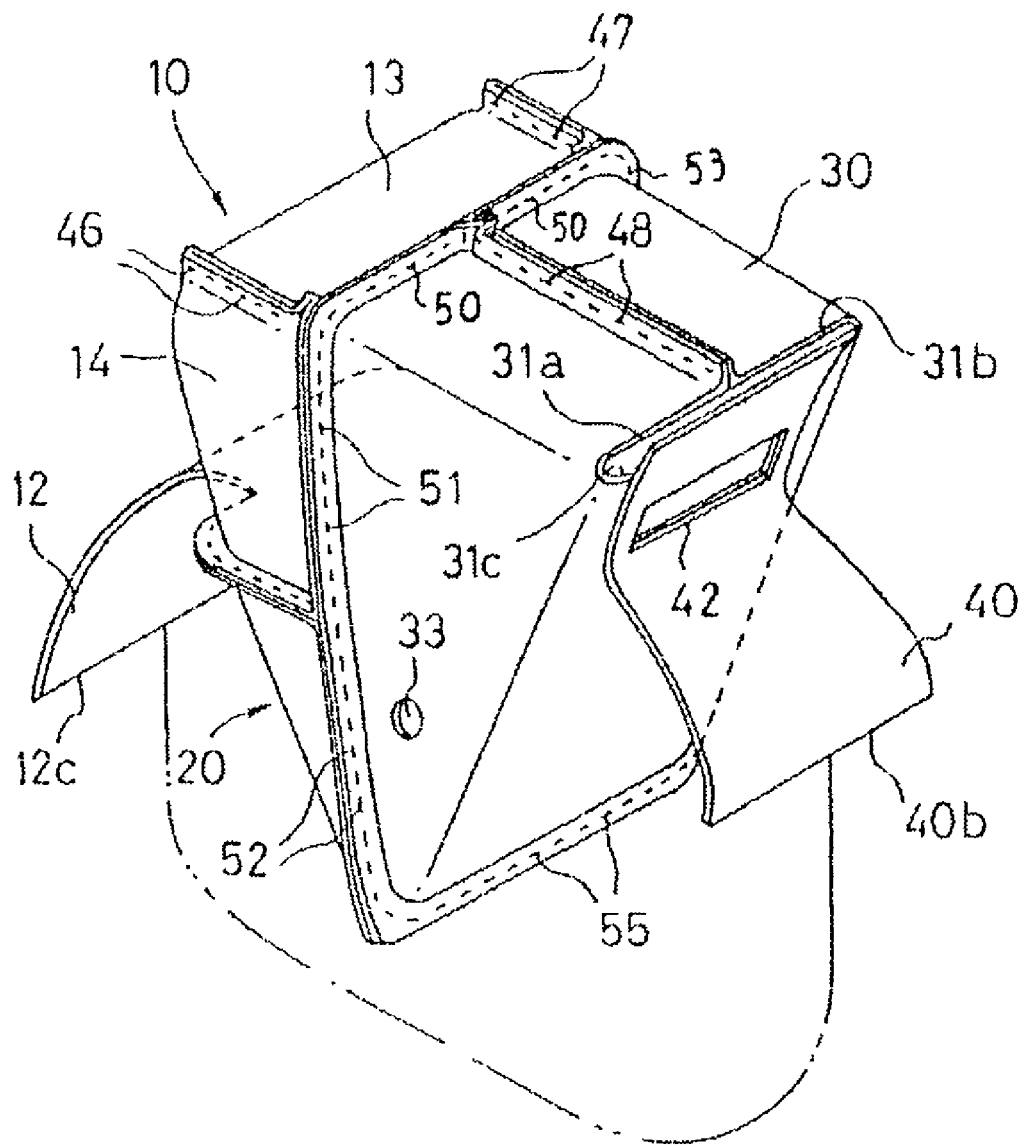
FIG. 8 is a perspective view showing a process for producing the air bag shown in FIG. 1(a).
Figure 9:
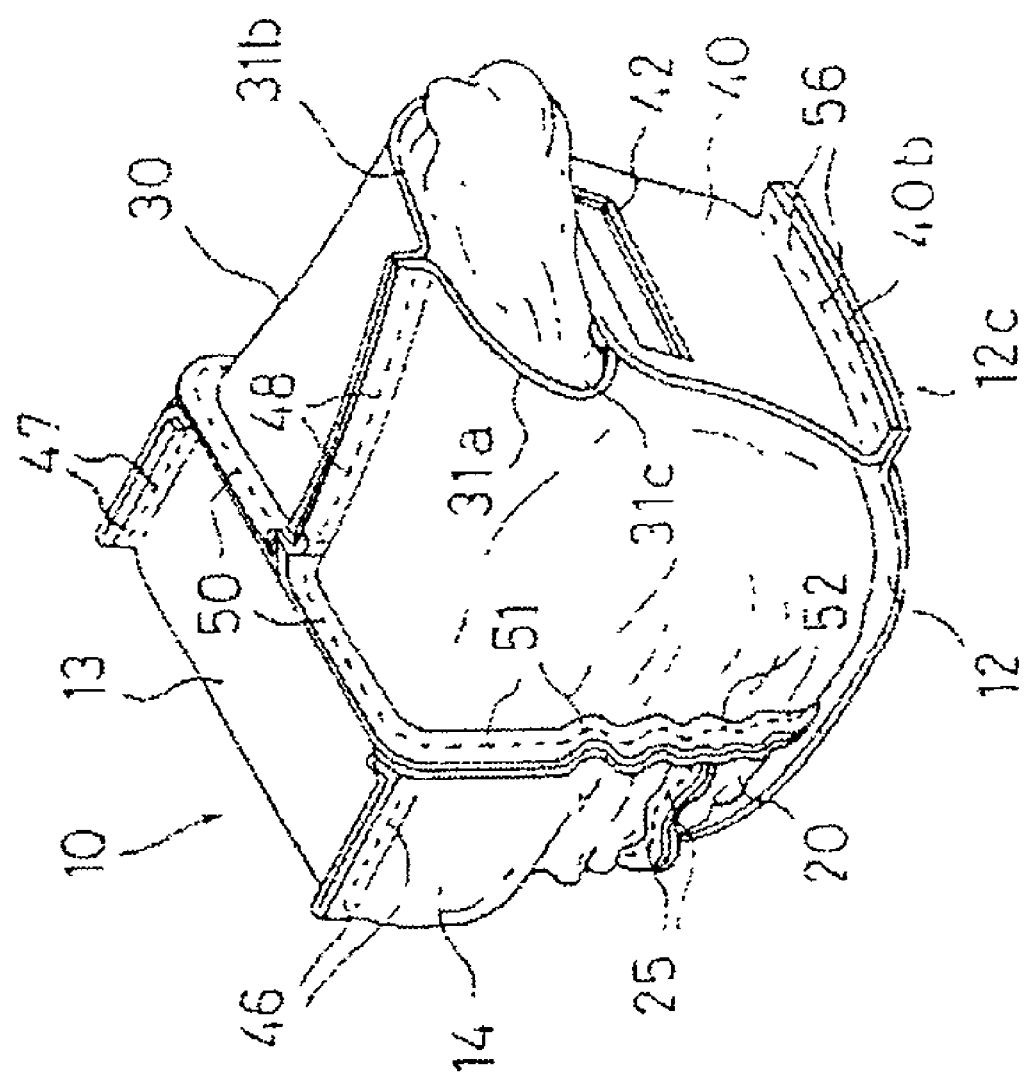
FIG. 9 is a perspective view showing a process for producing the air bag shown in FIG. 1(a).
Figure 10A:
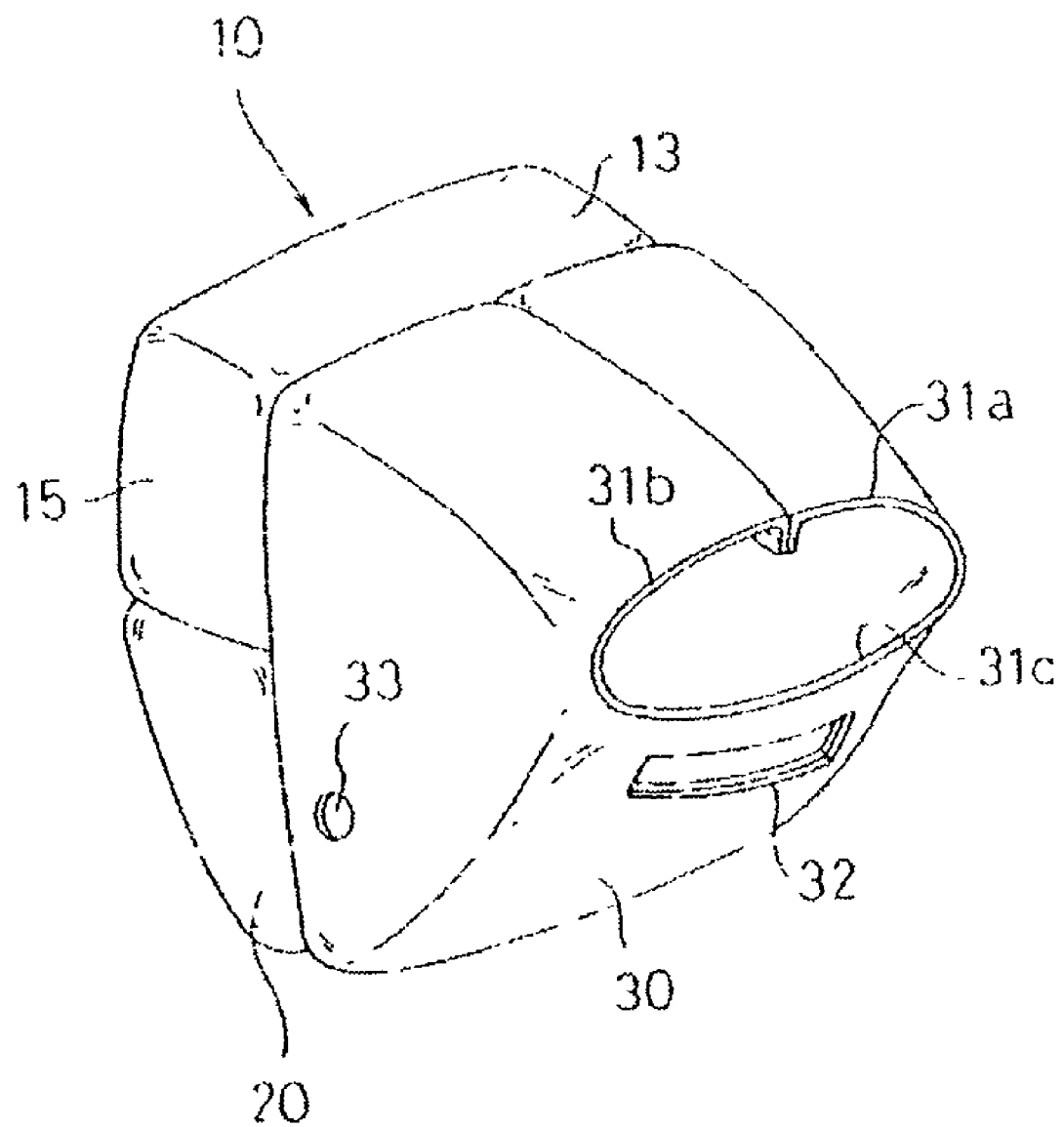
FIGS. 10(a) and 10(b) are perspective views showing a process for producing the air bag shown in FIG. 1(a).
Figure 10B:
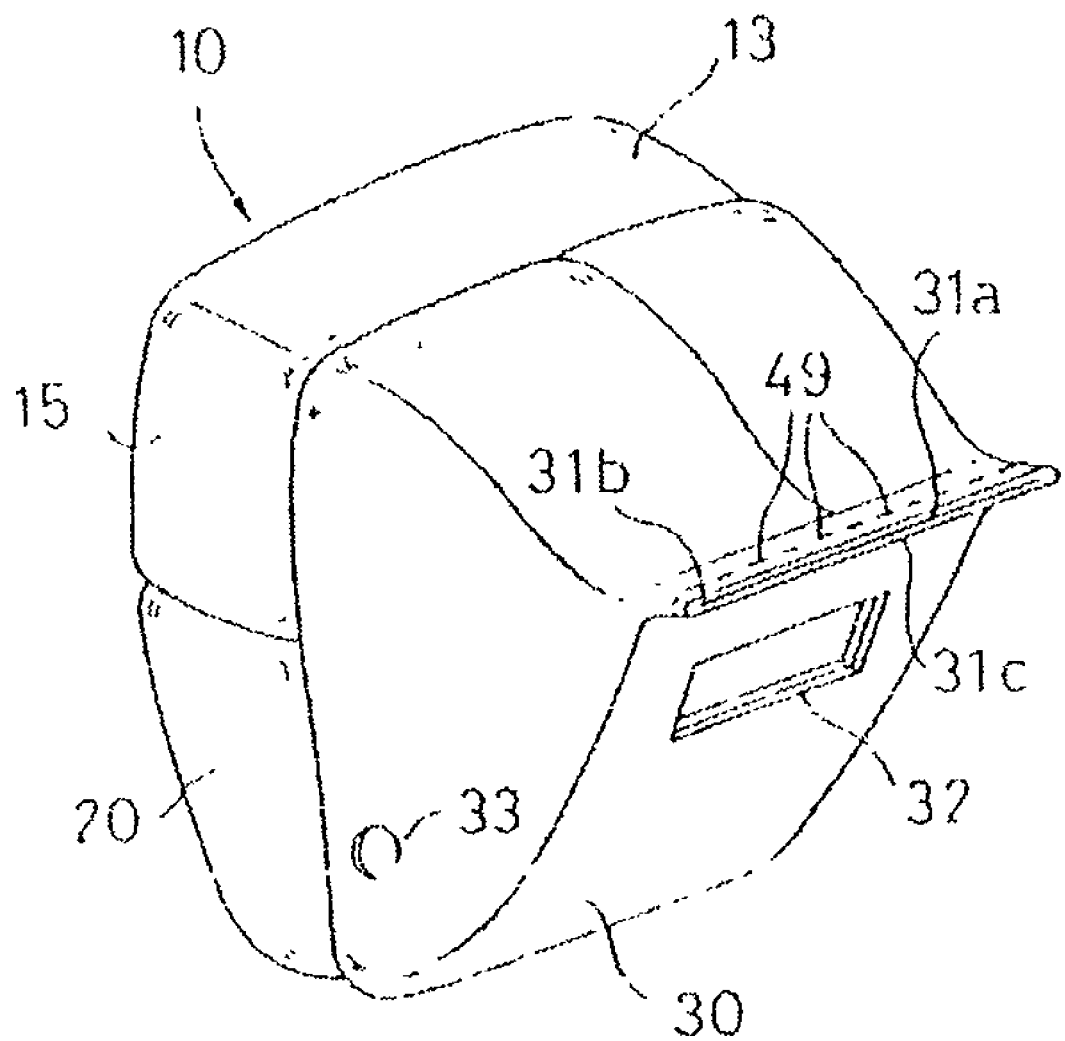

As shown in FIGS. 7 to 9, the side edges 13a, 13b of the top portion 13 are sewn to the upper edges 14a, 15a of the side portions 14, 15 at seams 46, 47. In the rear panel 30, the upper edges 30a on both sides of the cutout 31 are sewn together at seams 48, and the cutout side edges 31a and 31b and the cutout bottom edge 31c are sewn together at seams 49 (see FIG. 10(b)).

The leading edge 13c of the top portion 13 of the front upper panel 10 and upper portions of the side edges 30c and 30d of the rear panel 30 (portions adjacent to the upper edge 30a, portions to be placed on the upper surface of the air bag) are sewn together at seams 50 (FIGS. 1(b), 8, and 9). The leading edge 14c of the side portion 14 of the front upper panel 10 and the side edge 30c of the rear panel 30 are sewn together at seams 51.

Figure 6A:
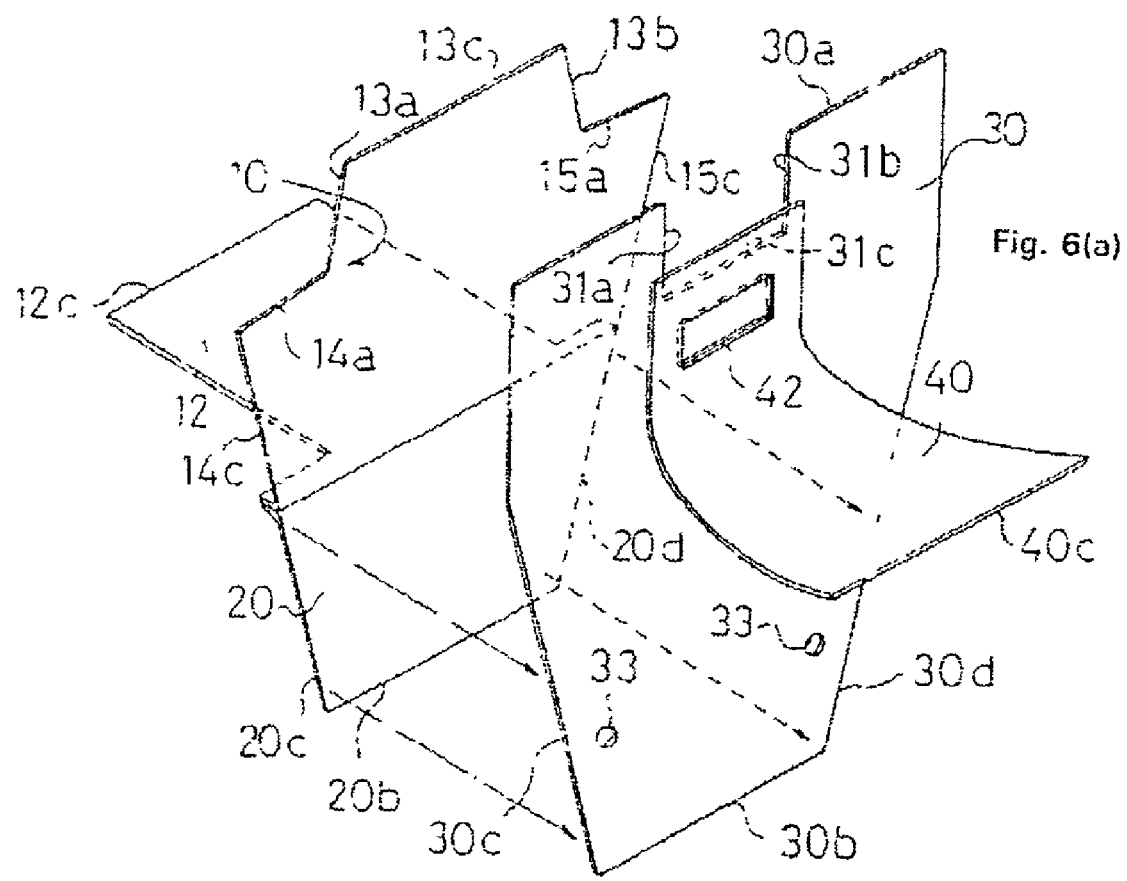
FIGS. 6(a) and 6(b) are perspective views showing a process for producing the air bag shown in FIG. 1(a).
Figure 6B:
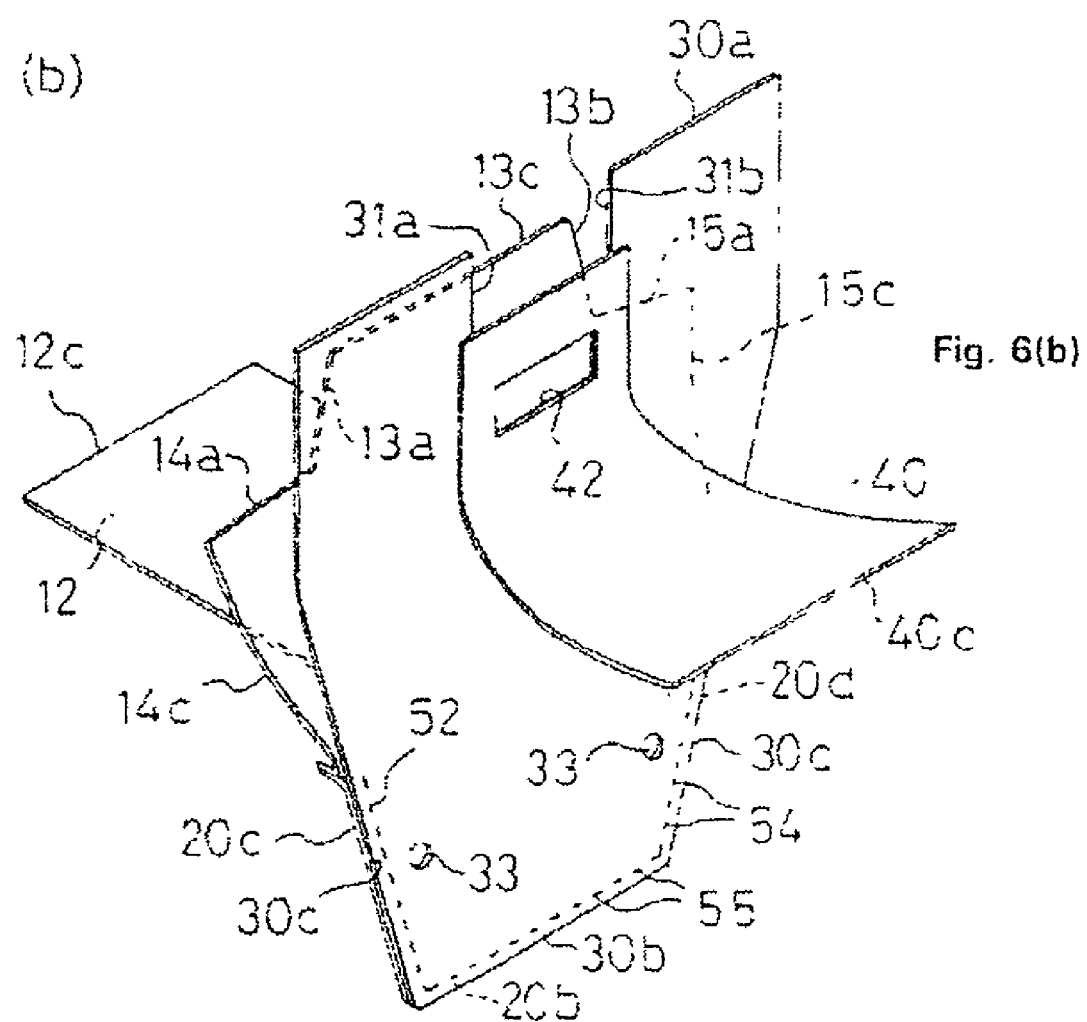

The side edge 20c of the front lower panel 20 and the side edge 30c of the rear panel 30 are sewn together at seams 52 (FIGS. 6 to 9). The leading edge 15c of the side portion 15 of the front upper panel 10 and the side edge 30d are sewn together at seams 53 (FIG. 8). The side edge 20d of the front lower panel 20 and the side edge 30d of the rear panel 30 are sewn together at seams 54 (FIG. 6).

The lower edge 30b of the rear panel 30 and the lower edge 20b of the front lower panel 20 are sewn together at seams 55 (FIGS. 1(b) and 6 to 9). The lower edge 40b of the mid panel 40 and the lower edge 12c of the extending piece 12 are sewn together at seams 56 (FIG. 1(b)).

As shown in FIG. 1, most of the seams are placed inside the airbag (see seams 46–48 and 50–55). The seam 49 at the rear of the airbag is exposed. However, seams are not exposed from the front face and both side faces of the air bag 1, and the faces are smooth.

The gas inlets 32 and 42 of the air bag 1 are connected to a container 60. The container 60 is provided with an inflator 61. The air bag 1 is held inside the container 60 in a folded state, and is covered with a lid. As shown in FIG. 1, the width of a connecting piece 4 formed of the mid panel 40 and the extending piece 12 of the front upper panel 10 is set to be substantially equal to or more than the width of the air bag body when the air bag 1 is expanded.

When the inflator 61 is actuated, the air bag 1 is caused by discharged gas to expand while pushing the lid open. In the air bag 1, a chamber 2 on the upper side of the connecting piece 4 formed of the mid panel 40 and the extending piece 12 is first expanded, and the gas flows into a lower chamber 3 via the openings 18, thereby expanding the chamber 3.

Since the front and rear of the air bag 1 are connected by the connecting piece 4, the front of the air bag 1 will not excessively protrude toward the passenger. When the passenger butts against the air bag 1, the gas flows out from the vent holes 33 disposed in the lower chamber 3 so as to absorb impact.

Next, the procedure for sewing the air bag 1, according to an embodiment of the present inventin, will be described. First, the front upper panel 10 and the front lower panel 20 are sewn together at seams 25, as shown in FIGS. 3 and 4. The rear panel 30 and the mid panel 40 are sewn together at the seams 45a and 45b, as shown in FIG. 5.

Subsequently, as shown in FIG. 6, a front panel formed of a combination of the front upper panel 10 and the front lower panel 20, and the rear panel 30 are aligned so that their outer side faces (outer surfaces of the air bag as a product) are disposed opposed to each other, and the front lower panel 20 and the rear panel 30 are sewn together at the seams 52, 54, 55.

Next, a pair of intersecting side edges 13a and 14a, and a pair of intersecting side edges 13b and 15a of the cutouts 16 and 17 in the front upper panel 10 are aligned, as shown in FIG. 7(a), and are sewn together at the seams 46 and 47, as shown in FIG. 7(b). The upper edges 30a of the rear panel 30 are aligned and are sewn at the seams 48.

Next, as shown in FIG. 8, the front upper panel 10 and the rear panel 30 are sewn together at the seams 50, 51, and 53. Further, as shown in FIG. 9, the lower edge 40b of the mid panel 40 and the lower edge 12c of the extending piece 12 are sewn together at the seams 56.

Consequently, the air bag is sewn inside out. In this state, the cutout side edges 31a and 31b and the cutout bottom edge 31c are not sewn, but are open. Accordingly, the air bag is reversed through the open portion, as shown in FIG. 9. This brings about a state shown in FIG. 10(a). Then, the cutout side edges 31a and 31b at the open portion are sewn on the cutout bottom edge 31c at the seams 49. The air bag is thereby completed.

Figure 11:
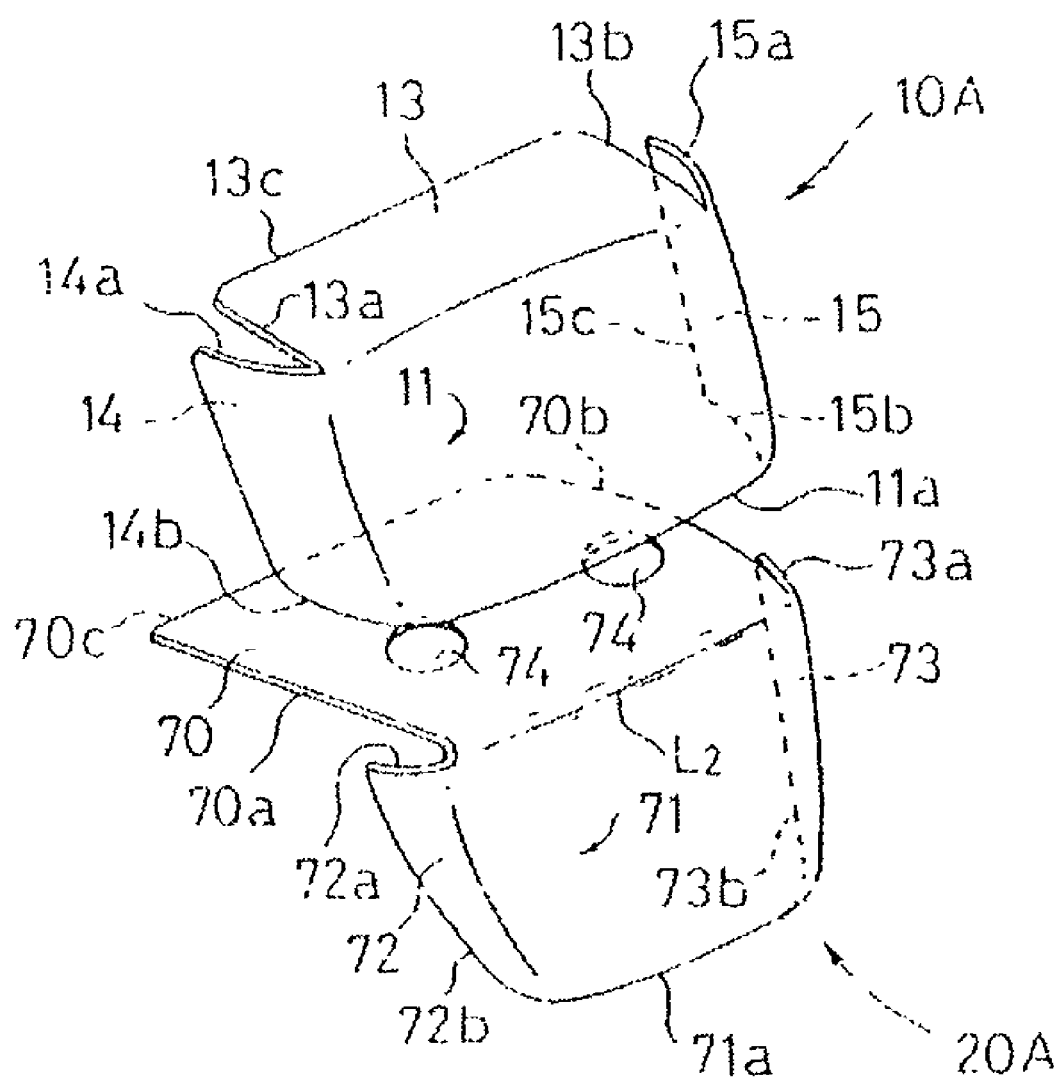
FIG. 11 is an exploded perspective view showing the principal part of an air bag according to another embodiment of the present invention.

While the front upper panel 10 has the extending piece 12 in the above embodiment, according to an alternative embodiment of the present invention, a structure, in which a front lower panel 20A has an extending piece 70 and a front upper panel 10A does not have an extending piece, as shown in FIG. 11, may be employed.

In the front lower panel 20A, the extending piece 70 is connected to a body portion 71. Side portions 72 and 73 project from both side edges of the body portion 71, and leading edges 72b and 73b thereof are sewn on a rear panel. Upper edges 72a and 73a of the side portions 72 and 73 are sewn on lower edges 14b and 15b of side portions 14 and 15 of the front upper panel 10A.

The extending piece 70 is shaped nearly like a rectangle including a pair of side edges 70a and 70b and a leading edge 70c, and the leading edge 70c is sewn on a mid panel. The extending piece 70 has openings 74. A lower edge 11a of the front upper panel 10A is sewn on a segment L2 of the front lower panel 20A. Sewn seams are placed inside the air bag.

Figure 12A:
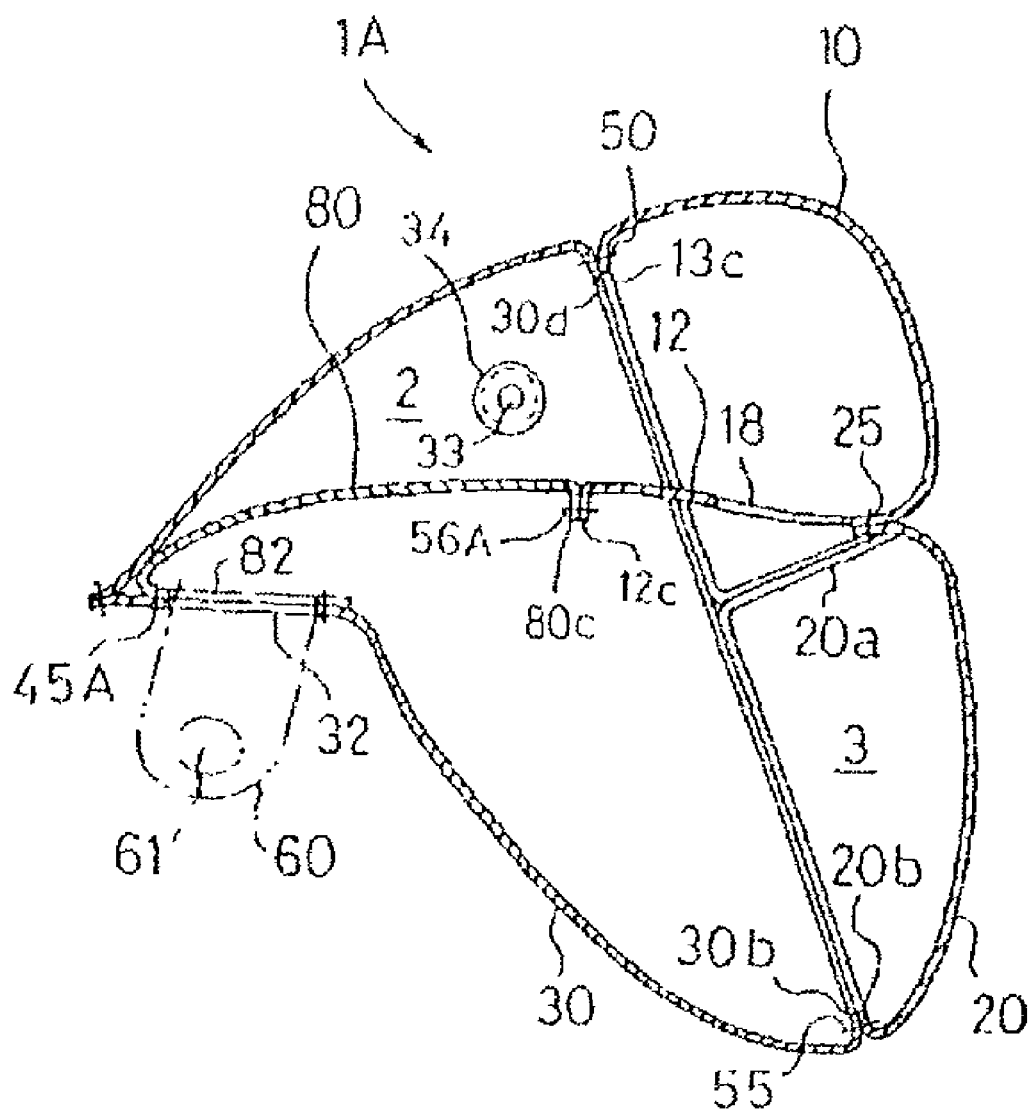
FIG. 12(a) is a sectional view of an air bag according to a further embodiment of the present invention.
Figure 12B:
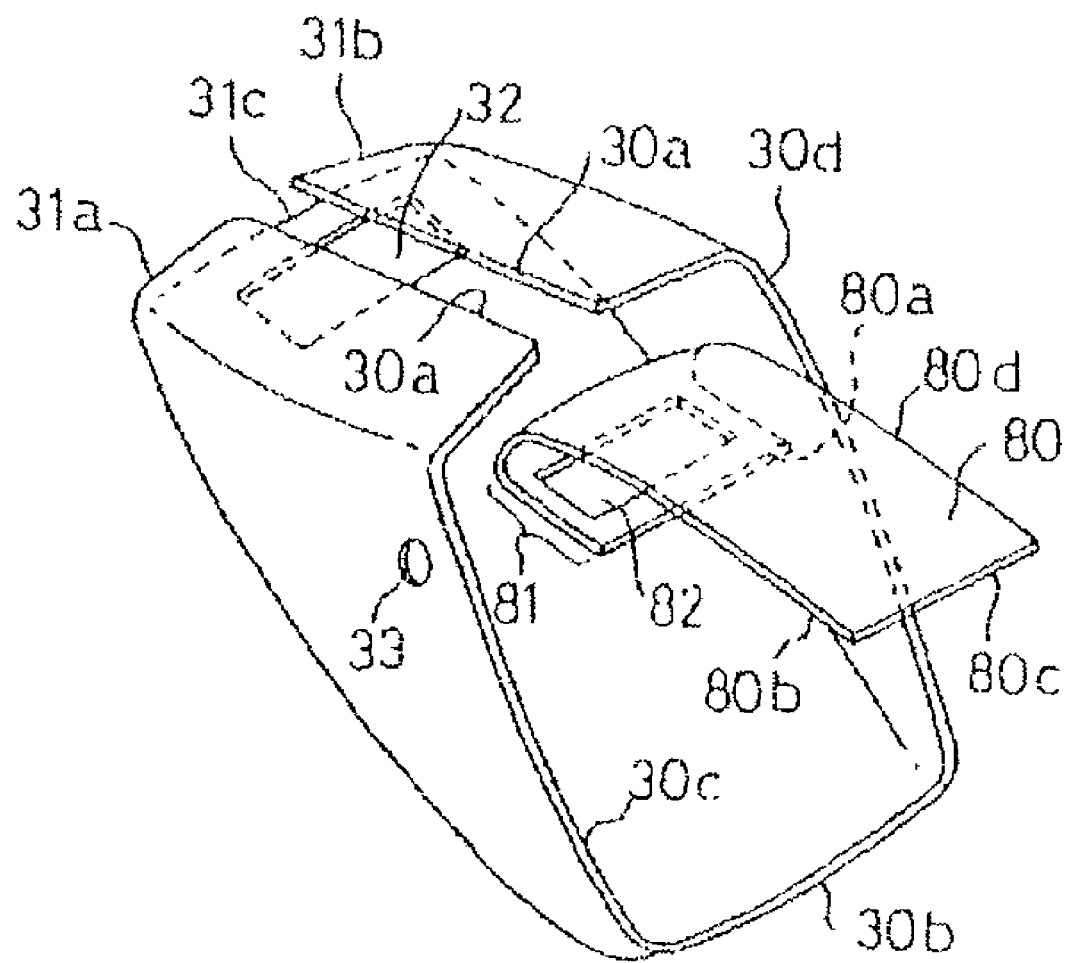
FIG. 12(b) is an exploded perspective view showing the principal part of the air bag of FIG. 12(a).

According to an embodiment of the present invention, a mid panel 80 may be folded at the rear edge toward the front side of a container 60 as in an air bag 1A shown in FIGS. 12(a) and 12(b). The mid panel 80 is made of a flame-resistant cloth or a reinforcing cloth, and has a gas inlet 82 adjacent to a base portion 81. A portion of the mid panel 80 around the gas inlet 82 is sewn on a rear panel 30 at seams 45A.

The mid panel 80 is shaped like a band having a pair of long side edges 80b and 80d, and an edge 80c thereof is sewn on a lower edge 12c of an extending piece 12 at seams 56A. In this embodiment, gas from an inflator 61 strikes the mid panel 80 made of a flame-resistant cloth, and does not directly strike the upper surface of the rear panel 30.

In the above embodiment, the gas from the inflator 61 is guided by the mid panel 80, and is put into a lower chamber 3 of the air bag 1A. As a result, in the air bag 1A, the chamber 3 is first expanded, and an upper chamber 2 is then expanded because the gas flows into the upper chamber 2 via openings 18 of the extending piece 12. In this embodiment, it is preferable that vent holes 33 formed in the air bag body be placed on the upper sides of the side faces of the rear panel 30, that is, in the upper chamber 2.

Figure 13:
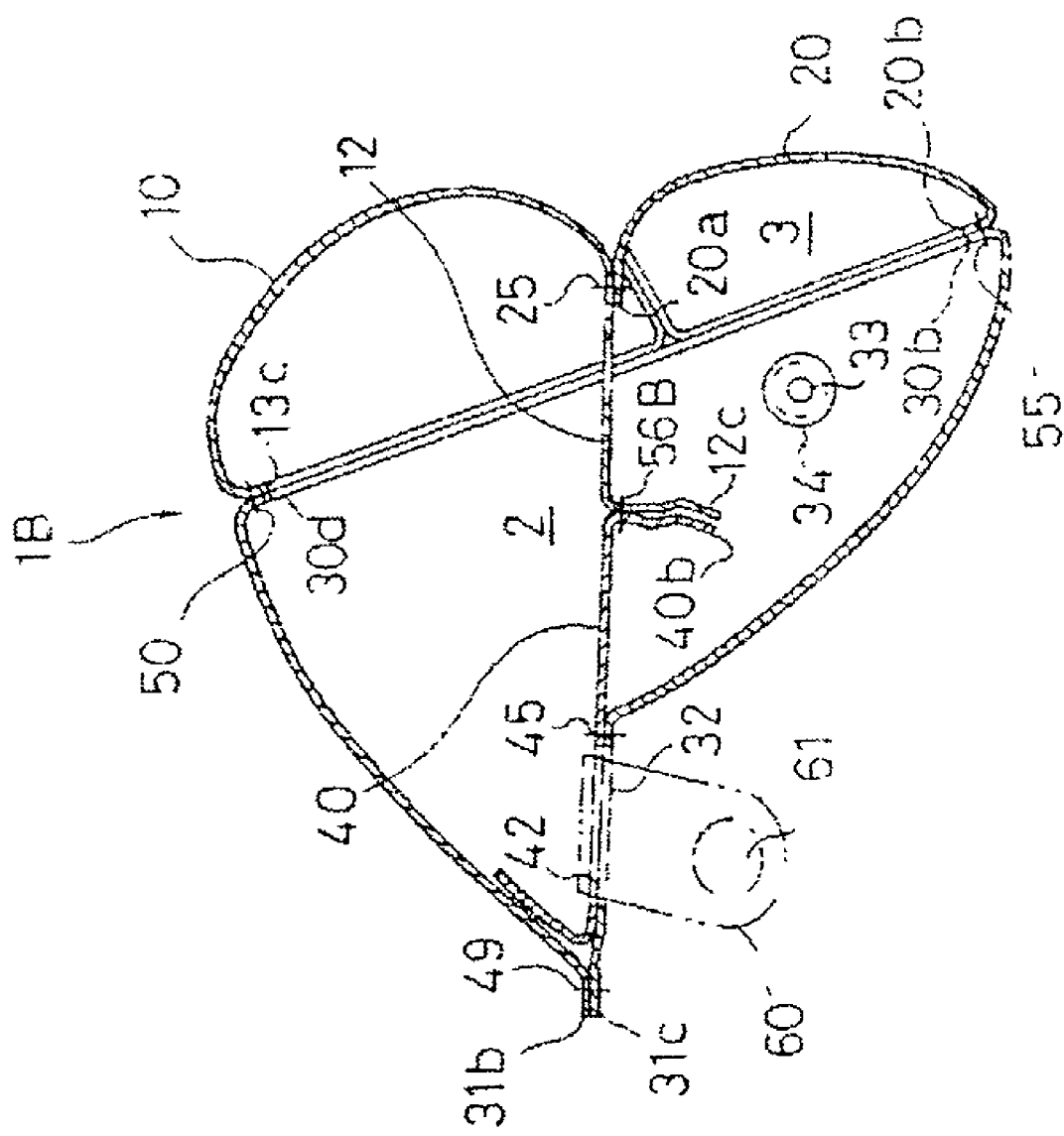
FIG. 13 is a sectional view of an air bag according to a yet further embodiment of the present invention.

According to another embodiment of the present invention, a mid panel 40 and an extending piece 12 may be sewn together at seams 56B at a small distance from edges 12c and 40b thereof, as shown in FIG. 13. In this case, the total length of the mid panel 40 and the extending piece 12 is decreased, and the center of the front surface of an air bag 1B is recessed rearward (toward the inner side of the air bag).

Figure 14:
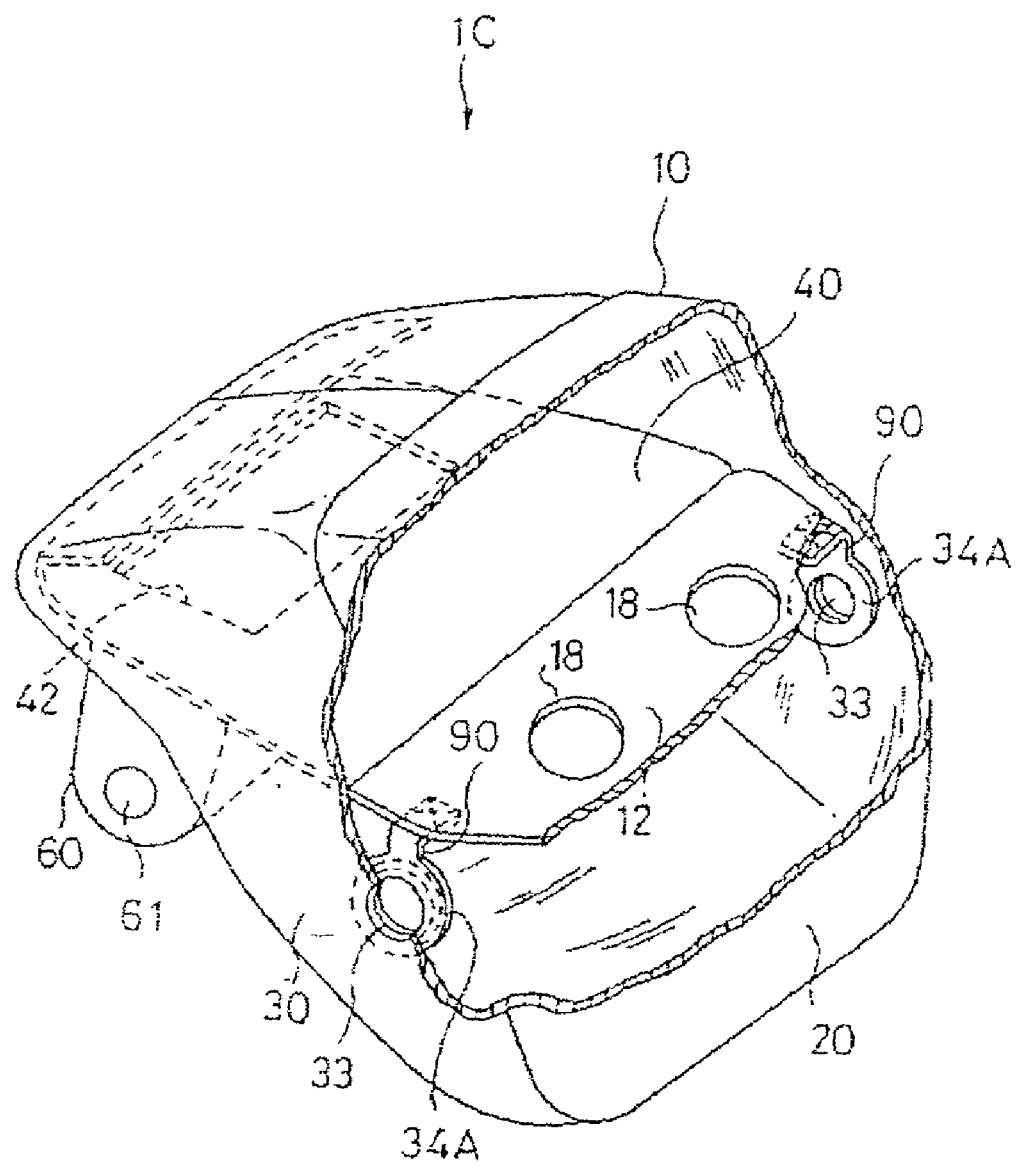
FIG. 14 is a partially cutaway perspective view of an air bag according to a still further embodiment of the present invention.

In the present invention, annular reinforcing cloths 34A may be sewn around vent holes 33, respectively, and ear portions 90 extending from the reinforcing cloths 34A and an extending piece 12 may be sewn together, as in an air bag 1C shown in FIG. 14. This arrangement limits an excessive expansion of the air bag in the widthwise direction.

The above embodiments are examples of the present invention, and the present invention is not limited to the illustrated embodiments. The present invention is also applicable to various air bags other than the passenger-side air bag.

As described in detail above, in the air bag of the present invention, the connecting piece for connecting the front and rear of the air bag connects the extending piece extending from a part of a plurality of front panels of the air bag into the air bag, and the mid panel placed inside the air bag. Since the connecting portions of the connecting piece are not exposed from the front surface of the air bag, and a connecting portion between a plurality of front panels is placed inside the air bag at the front surface of the air bag, the outer front surface of the front of the air bag can be made markedly smooth.

In the present invention, since all the panels are connected by flat sewing during the production of the air bag, sewing can be performed with great ease.

The priority application, Japanese Patent Applications Number 2001-244019, filed Aug. 10, 2001 is incorporated by reference herein in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An air bag comprising:
    a rear section and a front section;
    a gas inlet disposed in the rear section, and
    a connecting piece located inside the air bag and connecting the front section to the rear section;
    wherein an outer shell of the air bag is formed by a rear panel having the gas inlet, and a plurality of front panels connected to form the front section,
    wherein an extending piece extends from one of the front panels into the air bag, the extending piece and the rear section being connected by a mid panel,
    wherein the connecting piece is formed by the extending piece and the mid panel,
    wherein the front panels include a front upper panel and a front lower panel and one of the front upper panel and the front lower panel include a body portion and the extending piece formed integrally with the body portion,
    wherein an edge of the other of the front upper panel and the front lower panel is connected to a boundary portion between the body portion and the extending piece, and wherein the rear panel is directly connected to both the front upper panel and the front lower panel.

2. The air bag of claim 1, wherein the extending piece has an opening through which gas circulates.

3. The air bag of claim 1, wherein a connecting portion between the boundary portion and the edge of the other panel is placed inside the air bag.

4. The air bag of claim 1,
wherein a top portion of the front upper panel, side portions on both sides thereof, and side portions on both sides of the front lower panel are positioned on sides of the air bag,
wherein the top portion of the front upper panel is connected to the rear panel on an upper surface of the air bag,
wherein the side portions of the front upper panel and the side portions of the front lower panel are connected to the rear panel on sides of the air bag, and
wherein a lower edge of the front lower panel is connected to the rear panel at a bottom of the air bag.

5. The air bag of claim 4, wherein a connecting portion between the front upper panel and the rear panel, and a connecting portion between the front lower panel and the rear panel are placed inside the air bag.

6. The air bag of claim 1,
wherein the panels are connected together by sewing, and
wherein the air bag is reversed through an unsewn portion of the rear panel.

7. An airbag device comprising an airbag according to claim 1 and an inflator.

8. A passenger-side air bag comprising:
a front section including a pair of front panels forming an exterior surface,
wherein both front panels are positioned to face a passenger when the air bag deploys,
wherein one of the pair of front panels includes an integrally formed rearward extending section located inside the air bag and connecting the front section to a rear section,
wherein the rearward extending section includes an opening formed therein,
wherein a rear panel, which comprises a gas inlet, is directly connected to both of the front panels,
wherein a seam joining the pair of front panels is located away from the exterior surface so that the seam cannot contact the passenger when the air bag deploys,
wherein the rear section includes the rear panel and a mid panel, and
wherein the mid panel is connected to the rearward extending section and the rear panel.

9. The air bag of claim 8, wherein the mid panel includes a gas inlet opening for receiving pressurized gas from a gas generator.

10. The air bag of claim 8, wherein the front and rear sections of the air bag are connected together at a connecting seam that is positioned away from an exterior of the air bag so that the connecting seam cannot contact the passenger when the air bag deploys.

11. An airbag device comprising an airbag according to claim 8 and an inflator positioned in a container.

12. A passenger-side air bag comprising:
a front section including a pair of front panels forming an exterior surface,
wherein both front panels are positioned to face a passenger when the air bag deploys;
wherein one of the pair of front panels includes a rearward extending section located inside the air bag and connecting the front section to a rear section;
wherein the rear section includes a rear panel and a mid panel, the mid panel being connected to the rearward extending section and the rear panel;
wherein a seam joining the pair of front panels is located away from the exterior surface so that the seam cannot contact the passenger when the air bag deploys;
wherein the rearward extending section and the mid panel divide the air bag into upper and lower chambers;
wherein the rear panel, which comprises a gas inlet, is directly connected to both of the front panels; and
wherein the rearward extending section includes at least one opening formed therein for allowing gas to pass between the chambers.

13. An airbag device comprising an airbag according to claim 12 and an inflator positioned in a container.

* * * * *